United States Patent
Naoi et al.

(10) Patent No.: US 9,859,035 B2
(45) Date of Patent: Jan. 2, 2018

(54) PROCESS FOR PRODUCING COMPOSITE MATERIAL OF METAL OXIDE WITH CONDUCTIVE CARBON

(71) Applicant: NIPPON CHEMI-CON CORPORATION, Tokyo (JP)

(72) Inventors: Katsuhiko Naoi, Fuchu (JP); Wako Naoi, Kunitachi (JP); Satoshi Kubota, Tokyo (JP); Daisuke Yonekura, Tokyo (JP); Shuichi Ishimoto, Tokyo (JP); Kenji Tamamitsu, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 68 days.

(21) Appl. No.: 14/425,298

(22) PCT Filed: Aug. 28, 2013

(86) PCT No.: PCT/JP2013/072945
§ 371 (c)(1),
(2) Date: Mar. 2, 2015

(87) PCT Pub. No.: WO2014/034696
PCT Pub. Date: Mar. 6, 2014

(65) Prior Publication Data
US 2015/0228370 A1    Aug. 13, 2015

(30) Foreign Application Priority Data
Sep. 3, 2012   (JP) .................. 2012-193592

(51) Int. Cl.
*H01B 1/18* (2006.01)
*H01M 4/505* (2010.01)
(Continued)

(52) U.S. Cl.
CPC ............... *H01B 1/18* (2013.01); *C01G 45/02* (2013.01); *C01G 45/1242* (2013.01);
(Continued)

(58) Field of Classification Search
CPC .... C01G 45/02; C01G 45/1242; C01G 53/62; C01P 2002/32; C01P 2002/72;
(Continued)

(56) References Cited

U.S. PATENT DOCUMENTS

| 9,287,553 B2* | 3/2016 | Naoi | ................... C01B 25/45 |
| 2006/0147798 A1* | 7/2006 | Lu | ................... H01M 4/485 |
| | | | 429/224 |

(Continued)

FOREIGN PATENT DOCUMENTS

| JP | 2-109260 A | 4/1990 |
| JP | 2005-63677 A | 3/2005 |

(Continued)

OTHER PUBLICATIONS

Habashi, F. "Metals: typical and less typical, transition and inner transition," Found Chem (2010) 12:31-39.*

(Continued)

*Primary Examiner* — Mark Kopec
*Assistant Examiner* — Jaison P Thomas
(74) *Attorney, Agent, or Firm* — Birch, Stewart, Kolasch & Birch, LLP

(57) ABSTRACT

Provided is a method whereby metal oxide nanoparticles having evenness of size are efficiently and highly dispersedly adhered to conductive carbon powder. This method comprises: a preparation step in which a reaction solution containing water, a compound with a transition metal selected from the group consisting of Mn, Fe, Co, and Ni, and conductive carbon powder and having a pH in the range of 9 to 11 is introduced into a rotatable reactor; a supporting
(Continued)

(a) Comparative Example 1: before heat treatment (b) Example 5: before heat treatment step in which the reactor is rotated to apply shear stress and centrifugal force to the reaction solution, thereby yielding a core of a hydroxide of the transition metal and dispersing the thus-yielded core of a hydroxide of the transition metal and the conductive carbon powder and simultaneously supporting the hydroxide of the transition metal by the conductive carbon powder; and a heat treatment step in which the conductive carbon powder loaded with the hydroxide of the transition metal is heated to thereby convert the hydroxide supported by the conductive carbon powder into an oxide nanoparticle.

4 Claims, 6 Drawing Sheets

(51) Int. Cl.
  C01G 45/12      (2006.01)
  C01G 45/02      (2006.01)
  C01G 53/00      (2006.01)
  H01M 4/62       (2006.01)
  H01M 4/36       (2006.01)
  H01M 10/052     (2010.01)

(52) U.S. Cl.
  CPC ............ *C01G 53/62* (2013.01); *H01M 4/505* (2013.01); *H01M 4/625* (2013.01); *C01P 2002/32* (2013.01); *C01P 2002/72* (2013.01); *C01P 2002/88* (2013.01); *C01P 2004/03* (2013.01); *C01P 2004/04* (2013.01); *C01P 2004/64* (2013.01); *C01P 2004/80* (2013.01); *H01M 4/366* (2013.01); *H01M 10/052* (2013.01)

(58) Field of Classification Search
  CPC ............ C01P 2002/88; C01P 2004/03; C01P 2004/04; C01P 2004/64; C01P 2004/80; H01B 1/18; H01M 10/052; H01M 4/366; H01M 4/505; H01M 4/625
  See application file for complete search history.

(56) References Cited

U.S. PATENT DOCUMENTS

| | | | |
|---|---|---|---|
| 2010/0025627 A1* | 2/2010 | Naoi ................... | B01F 7/164 252/182.1 |
| 2010/0248011 A1 | 9/2010 | Pozin et al. | |
| 2012/0132861 A1* | 5/2012 | Tamamitsu ............ | H01G 11/24 252/507 |
| 2012/0183860 A1* | 7/2012 | Naoi ................... | H01G 11/24 429/231.8 |
| 2014/0087258 A1 | 3/2014 | Kabe et al. | |

FOREIGN PATENT DOCUMENTS

| | | |
|---|---|---|
| JP | 2007-160151 A | 6/2007 |
| JP | 2009-4371 A | 1/2009 |
| JP | 2009-44009 A | 2/2009 |
| JP | 2011-228062 A | 11/2011 |
| JP | 2013-211114 A | 10/2013 |
| WO | WO 2010/111103 A1 | 9/2010 |
| WO | WO 2012/147766 A1 | 1/2012 |

OTHER PUBLICATIONS

International Search Report issued in PCT/JP2013/072945, dated Nov. 12, 2013.

\* cited by examiner

PROCESS FOR PRODUCING COMPOSITE MATERIAL OF METAL OXIDE WITH CONDUCTIVE CARBON

BACKGROUND OF THE INVENTION

1. Field of the Invention

The present invention relates to a manufacturing method of a composite material of a nanoparticle of a metal oxide having any of Fe, Ni, Co or Mn, with conductive carbon powder.

2. Description of the Related Art

A composite material that contains a metal oxide and conductive carbon is widely utilized in the field such as a fuel battery, a secondary battery, an electrochemical capacitor, or an antistatic material. Especially, a compound oxide of a transition metal such as Mn, Ni, Co or Fe and a typical metal belonging to group 1 or 2 in the periodic table such as Li or Mg is expected to be a positive electrode active material of a secondary battery such as a lithium ion secondary battery or a magnesium ion secondary battery, and composite materials of the compound oxide with conductive carbon have been frequently considered.

These composite materials are generally manufactured by a method to mix a metal oxide particle and conductive carbon powder or by a method to support a prepared metal oxide on conductive carbon powder during a production process for the metal oxide.

For example, Patent Document 1 (JP H2-109260 A) discloses a positive electrode of a lithium ion secondary battery in which $LiMn_2O_4$, which is obtained by dissolving a lithium source such as lithium nitrate or lithium hydroxide in water, adding manganese nitrate as a manganese source to the solution, and giving heat treatment to the solution, is mixed with a conductive agent such as acetylene black and pressure-formed. Also, Patent Document 2 (JP 2005-63677 A) discloses an electrode catalyst of a fuel battery that is manufactured by mixing powder of a metal oxide such as manganese oxide, cobalt oxide or nickel oxide and a conductive agent such as conductive carbon black powder and coating the mixture obtained on a conductive porous substrate.

As a method to support a prepared metal oxide on conductive carbon powder in a formation process for the metal oxide, the applicant has proposed in Patent Document 3 (JP 2007-160151 A) a reaction method to promote chemical reaction by adding shear stress and centrifugal force to a reactant in a turning reactor. This document shows that a composite material, in which a nanoparticle of an oxide such as titanium oxide or ruthenium oxide is supported on conductive carbon powder in a highly dispersed state by a sol-gel reaction accelerated by addition of shear stress and centrifugal force, is suitable for a positive electrode or a negative electrode of a battery or an electrochemical capacitor.

PRIOR ARTS DOCUMENTS

Patent Documents

Patent Document 1: JP H2-109260 A
Patent Document 2: JP 2005-63677 A
Patent Document 3: JP 2007-160151 A

BRIEF SUMMARY OF THE INVENTION

1. Problems to be Solved by the Invention

In a composite material of a metal oxide with conductive carbon that is specifically used as an electrode material of a battery and an electrochemical capacitor, high reaction activity can be expected if the metal oxide is fine and has a high surface area. Also, where a compound oxide is obtained by reacting two kinds of metal compounds as is shown in Patent Document 1, it is expected that an even compound oxide can be rapidly obtained if a compound as a raw material is fine.

In this regard, the reaction method described in Patent Document 3 to add shear stress and centrifugal force to a reactant in a rotating reactor is suitable because a nanoparticle of one or more than one kind of metal oxide can be supported by conductive carbon powder. Also, because the metal oxide is supported on the conductive carbon powder, the process to further mix a conductive agent is not necessary, or the amount of the conductive agent can be decreased. However, the method specifically shown in Patent Document 3 is a sol-gel reaction accelerated by adding shear stress and centrifugal force, and application of this reaction method has not been fully considered yet.

Therefore, the objective of the present invention is to provide a method to attach a nanoparticle of an even-size metal oxide to conductive carbon powder with good efficiency and dispersibility by using the reaction method to add shear stress and centrifugal force to a reactant in the rotating reactor.

2. Means for Solving Problems

The inventors keenly examined a technique of Patent Document 3 as a basis for the present invention. As a result, it was found that, when a compound of a transition metal selected from a group consisting of Mn, Fe, Co and Ni and conductive carbon powder were added to water, the compound of a transition metal was dissolved into water, the pH of the solution was adjusted in a range between 9 to 11, and then shear stress and centrifugal force were added to this solution in a rotating reactor, a core of a hydroxide of the transition metal was formed and this core was supported on the conductive carbon powder as an even-size fine particle, and almost all of the transition metals contained in the raw material were efficiently supported as the hydroxide on the conductive carbon powder. The inventors also found that a composite material that comprises a nanoparticle of an even-size metal oxide and the conductive carbon powder with good dispersibility is obtained when the conductive carbon powder supporting the hydroxide is heat-treated.

Therefore, the present invention firstly relates to a method for producing a composite material of a metal oxide and conductive carbon (hereinafter referred to as the "first manufacturing method"), comprising:

a preparation step to introduce a reaction solution comprising water, at least one compound with a transition metal selected from a group consisting of Mn, Fe, Co and Ni, and conductive carbon powder and having a pH in a range of 9 to 11 into a rotatable reactor;

a supporting step to add shear stress and centrifugal force to the reaction solution by rotating the reactor so as to form a core of a hydroxide of the transition metal, disperse the core of a hydroxide of the transition metal obtained and the conductive carbon powder, and simultaneously support the hydroxide of the transition metal by the conductive carbon powder; and a heat treatment step to heat the conductive carbon powder supporting the hydroxide of the transition metal so as to transform the hydroxide of the transition metal supported by the conductive carbon powder to a nanoparticle of an oxide.

The present invention also relates to a method for producing a composite material of a metal oxide and conductive carbon (hereinafter referred to as the "second manufacturing method"), comprising:

a preparation step to introduce a reaction solution comprising water, at least one compound with a transition metal selected from a group consisting of Mn, Fe, Co and Ni, and conductive carbon powder and having a pH in a range of 9 to 11 into a rotatable reactor;

a supporting step to add shear stress and centrifugal force to the reaction solution by rotating the reactor so as to form a core of a hydroxide of the transition metal, disperse the core of a hydroxide of the transition metal obtained and the conductive carbon powder, and simultaneously support the hydroxide of the transition metal by the conductive carbon powder; and a heat treatment step to heat a mixture obtained by mixing the conductive carbon powder supporting the hydroxide of the transition metal with at least one compound with a typical metal selected from a group consisting of elements in groups 1 and 2 of the periodic table so as to react the hydroxide of the transition metal supported by the conductive carbon powder and the compound of a typical metal and transform to a nanoparticle of a compound oxide.

In the present invention, a hydroxide oxide or hydrous oxide, which does not actually exist but is conventionally represented as hydroxide, such as $Mn(OH)_3$ ($Mn_2O_3.nH_2O$), $Fe(OH)_3$ ($Fe_2O_3.nH_2O$), $Co(OH)_3$ ($Co_2O_3.nH_2O$) or $Ni(OH)_3$ ($Ni_2O_3.nH_2O$), is included in the category of hydroxide. Moreover, a nanoparticle means a particle with a diameter of 1 to 100 nm, preferably 5 to 50 nm, and especially preferably 10 to 40 nm. Also in the present invention, a solid solution is included in the categories of a metal oxide and a compound oxide.

When the pH of a solution in which a chemical compound of a transition metal selected from a group consisting of Mn, Fe, Co and Ni is dissolved into water is raised, Mn, Fe, Co or Ni is coordinated with OH, and when the pH is further raised, the hydroxide of the transition metal eventually becomes insolubilized. In the preparation step of the present invention, a reaction solution, in which the pH is adjusted in the range of 9 to 11, is put in a rotatable reactor, or the reaction solution is prepared in the rotatable reactor. The hydroxide of the transition metal that is insolubilized may be found in the reaction solution, but in the preparation step most of the transition metal in the reaction solution is not supported on the conductive carbon powder.

Then, in the supporting step, when the reactor is turned, a core of the hydroxide is formed by the shear stress and centrifugal force produced by this turning, that is, by mechanical energy. This core evenly grows while being dispersed in the rotating reactor, and is supported on the conductive carbon powder as an even-size fine particle. Also, the supporting step is efficient because almost all of the transition metal in the reaction solution is supported as the hydroxide on the conductive carbon powder. If the pH of the reaction solution is less than 9, the formation efficiency of the core of the hydroxide in the step of adding shear stress and centrifugal force to the reaction solution is low, and if the pH is more than 11, the speed of insolubilization of the hydroxide in the supporting step is too fast and fine hydroxide is difficult to be obtained. Therefore, by adjusting the pH of the reaction solution within the range of 9 to 11 and adding mechanical energy to the reaction solution in the rotating reactor, the core of the hydroxide can be efficiently formed in the reaction solution, and further, the hydroxide can be supported by the conductive carbon powder as an even-size fine particle.

In the first manufacturing method of the present invention, in the heat treatment step, by heat-treating the conductive carbon powder supporting the hydroxide as an even-size fine particle, the hydroxide is transformed into an oxide nanoparticle on the conductive carbon powder. In the first manufacturing method, because the conductive carbon powder supporting the hydroxide as an even-size fine particle is used, the oxidation reaction of the hydroxide progresses rapidly and evenly, and the oxide nanoparticle obtained also becomes fine and has an even size. Also, in the second manufacturing method of the present invention, a nanoparticle of a compound oxide is formed on conductive carbon powder by mixing the conductive carbon powder supporting the hydroxide as an even-size fine particle with a compound of a typical metal belonging to groups 1 and 2 of the periodic table, preferably a hydroxide, or especially preferably lithium hydroxide, and then giving heat treatment so as to react the hydroxide of a transition metal and the compound of a typical metal. In the second manufacturing method, because the conductive carbon powder supporting the hydroxide as an even-size fine particle is used, the reaction between the hydroxide of a transition metal and the compound of a typical metal progresses in a rapid and even manner, and the nanoparticle of a compound oxide obtained is also fine and has an even size.

In the present invention, a method for preparing the reaction solution that is introduced into the rotatable reactor in the preparation step does not have any restriction as long as its pH is in the range of 9 to 11, but preparation of the reaction solution by mixing a solution in which the conductive carbon powder and a water-soluble salt of the transition metal are added to water and the water-soluble salt is dissolved with a solution in which an alkali metal hydroxide, preferably lithium hydroxide, is dissolved in water is preferable, because the pH of the reaction solution can be adjusted efficiently.

In the present invention, the centrifugal force added to the reaction solution by turning the reactor in the supporting step is the centrifugal force in a category generally referred to as "ultracentrifugal force", which is preferably a centrifugal force of 1500 $kgms^{-2}$ or more, and especially preferably one of 70000 $kgms^{-2}$ or more. By applying the centrifugal force in this range, the hydroxide is supported on the conductive carbon powder as an even-size fine particle. In this description, the treatment to add shear stress and centrifugal force to the reaction solution in a rotating reactor may be referred to as "ultracentrifugal treatment."

As the rotatable reactor, any reactor that can add ultracentrifugal force to the reaction solution can be used without any restriction, but a reactor described in FIG. 1 of Patent Document 3, which comprises concentric cylinders of an external cylinder and an internal cylinder, where throughholes are placed on the side face of the rotatable internal cylinder, and where a shuttering board is placed on the open end of the external cylinder, is suitably used. The statement regarding the reactor in Patent Document 3 is incorporated in this description by reference. When this reactor is used, the reaction solution in the internal cylinder is moved to the external cylinder through the through-holes and the reaction solution slides up to the upper part of the inner wall of the external cylinder between the outer wall surface of the internal cylinder and the inner wall surface of the external cylinder, by the centrifugal force produced by the turning of the internal cylinder. As a result, shear stress and centrifugal force are added to the reaction solution, and by the mechanical energy, a core of a hydroxide of the transition metal is formed between the outer wall surface of the internal cylinder and the inner wall surface of the external cylinder. Then, this core evenly grows while being dispersed in the rotating reactor, and the grown hydroxide is supported by the conductive carbon powder as an even-size fine particle.

As for the reactor that has an external cylinder and an internal cylinder, it is preferable that a gap between the outer wall surface of the internal cylinder and the inner wall surface of the external cylinder is narrower because greater mechanical energy can be added to the reaction solution. The gap between the outer wall surface of the internal cylinder and the inner wall surface of the external cylinder is preferably 5 mm or less, and more preferably 2.5 mm or less.

In the present invention, the heat-treatment condition in the heat treatment step has no restriction as long as an oxide is obtained, but it is preferable to give heat treatment in an atmosphere containing oxygen at a temperature between 200 to 300° C. This is because the conductive carbon powder is not burnt even in the atmosphere containing oxygen if the temperature is 300° C. or less and a metal oxide can be obtained with good crystalline structure. If heat treatment is given in an atmosphere not containing oxygen, the oxide may be reduced and the target oxide may not be obtained.

The composite material of a metal oxide and conductive carbon that is obtained by the method of the present invention can be suitably used for the purpose such as an electrode catalyst in a fuel battery, an electrode active material of a secondary battery such as a lithium ion secondary battery and a magnesium ion secondary battery, an electrode active material of an electrochemical capacitor, or an antistatic material. Especially, carbon powder supporting a nanoparticle of $LiMO_2$ that has a layered rock salt structure, or a layered $Li_2MnO_3$—$LiMO_2$ solid solution, or a spinel-type $LiM_2O_4$ (M in the formulas is Mn, Fe, Co, Ni or a combination thereof), preferably the nanoparticle with the initial particle diameter between 10 to 40 nm, which is obtained by using a lithium compound as the compound of a typical metal in the heat treatment step of the second manufacturing method of the present invention, is especially preferable as a positive active material of a lithium ion secondary battery, and produces a lithium ion secondary battery with excellent rate characteristics. Also, in the preparation of $LiMO_2$ that has a layered rock salt structure and a layered $Li_2MnO_3$—$LiMO_2$ solid solution, it is preferable to give hydrothermal treatment after heat treatment in an atmosphere containing oxide at a temperature between 200 to 300° C. in the heat treatment step. In the heat treatment step, a spinel may be formed together with the compound oxide with a layered structure, but the spinel is transformed into a layered structure by the hydrothermal treatment and thus a layered structure with good purity can be obtained.

Any carbon powder can be used without restriction as long as it has conductivity, but it is preferable to use carbon nanotube at least partly as the conductive carbon powder because a composite material with excellent conductivity is obtained, and a positive electrode active material that leads to a lithium ion secondary battery with particularly excellent rate characteristics is obtained.

3. Advantageous Effects of the Invention

By the method of the present invention to manufacture a composite material of a metal oxide with conductive carbon by adding shear stress and centrifugal force to a reactant in a rotating reactor, even-size nanoparticles of the metal oxide can be attached to the conductive carbon powder efficiently and with good dispersibility.

DETAILED DESCRIPTION OF THE INVENTION

Figure 1:
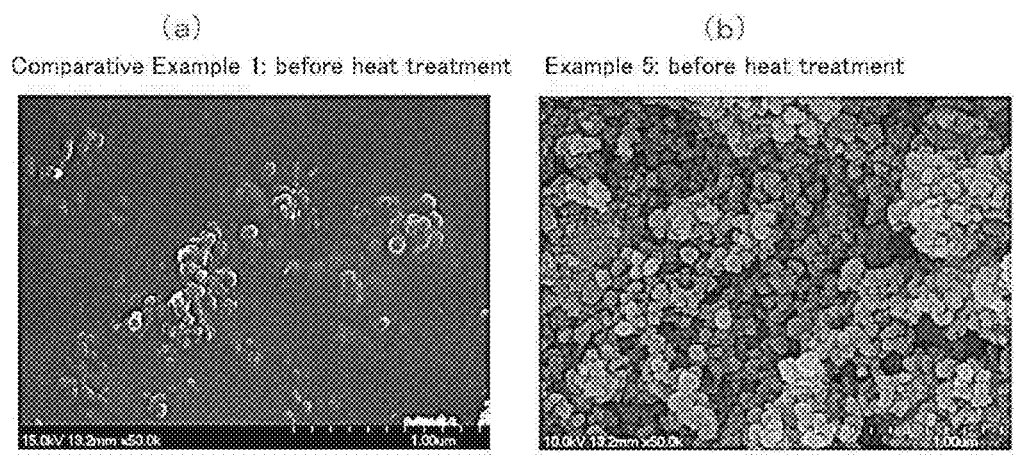
FIG. 1 shows SEM images of the powder in the middle of manufacturing a composite material of $LiMn_2O_4$ and conductive carbon; (a) is an image of a comparative example and (b) is an image of a working example.

A first manufacturing method and a second manufacturing method of the present invention are similar in that they both use the same preparation step and the supporting step; they only differ in terms of the heat treatment step. In the following, the preparation steps and the supporting steps used in the first manufacturing method and the second manufacturing method are explained once and the two different heat treatment steps are explained separately.

(1) Preparation Step

In the preparation step, a reaction solution comprising water, at least one compound with a transition metal selected from a group consisting of Mn, Fe, Co and Ni, and conductive carbon powder and having a pH in a range of 9 to 11 is introduced into a rotatable reactor. In the present invention, water is used as a solvent. The solvent may contain organic solvent to the extent that it does not affect the present invention, but it is preferable that the solvent is water only.

As for the carbon powder, any carbon powder can be used without restriction as long as it has conductivity. Examples are carbon black such as Ketjen Black, acetylene black and channel black, fullerene, carbon nanotube, carbon nanofiber, amorphous carbon, carbon fiber, natural graphite, artificial graphite, graphitized Ketjen Black, activated carbon, and mesoporous carbon. Also, vapor grown carbon fiber can be used. The carbon powder can be used alone, or used as a mixture of two or more kinds. It is preferable that at least a part of the carbon powder is carbon nanotube.

As for the at least one compound with a transition metal selected from a group consisting of Mn, Fe, Co and Ni, any water-soluble compound can be used without restriction. For example, an inorganic metallic salt of the transition metal such as halide, nitrate and sulfate, an organic metallic salt of the transition metal such as formate and acetate, and a mixture thereof can be used. These compounds can be used alone, or used in a mixture of two or more kinds. A compound that contains different transition metal can be mixed at given quantities and used.

It is preferable that adjustment of the pH of the reaction solution is made by an aqueous solution in which a hydroxide of an alkali metal, that is, Li, Na, K, Rb, Cs or Fr, is dissolved. The alkali metal hydroxide can be used alone, or a mixture of two or more kinds can also be used. Besides, a solution of an alkali metal oxide, ammonia or an amine can be used. A sole compound can be used for the adjustment of the pH, or two or more kinds of compounds can be mixed and used.

The reaction solution for the ultracentrifugal treatment is easily prepared by mixing a solution in which the conductive carbon powder and the water-soluble salt of the transition metal are added to water and the water-soluble salt is dissolved, with a solution in which a hydroxide of alkali metal is dissolved in water. Then, the pH of the reaction solution is adjusted in a range of 9 to 11. If the pH is less than 9, the efficiency to form a core of the hydroxide and the efficiency of supporting the hydroxide produced by the conductive carbon powder in the following supporting step are low, and if the pH is more than 11, the speed of insolubilization of the hydroxide in the supporting step is too rapid and it becomes difficult to gain fine hydroxide.

As the rotatable reactor, any reactor that can add ultracentrifugal force to the reaction solution can be used without restriction, and the reactor described in FIG. 1 of Patent Document 3, which comprises concentric cylinders of an external cylinder and an internal cylinder, where through-holes are placed on the side face of the rotatable internal cylinder, and where a shuttering board is placed on the open end of the external cylinder, is suitably used. The use of this suitable reactor is explained in the following.

The reaction solution for the ultracentrifugal treatment is introduced into the internal cylinder of the reactor. Reaction solution that has been prepared beforehand can be introduced into the internal cylinder, or reaction solution can be introduced by preparing it in the internal cylinder. It is preferable to put water, the conductive carbon powder and the water-soluble salt of the transition metal in the internal cylinder, turn the internal cylinder to dissolve the water-soluble salt of the transition metal in water and at the same time disperse the conductive carbon powder in the solution, after which the turning of the internal cylinder is suspended, and then, a solution in which the alkali metal hydroxide is dissolved in water is put into the internal cylinder to adjust the pH, and then the internal cylinder is turned again. This is because dispersion of the conductive carbon powder becomes excellent by the first turning so that the dispersibility of the nanoparticle of the metal oxide supported by the conductive carbon powder becomes excellent.

(2) Supporting Step

In the supporting step, shear stress and centrifugal force are added to the reaction solution by rotating the reactor so as to form a core of the hydroxide of the transition metal, disperse the core of a hydroxide of the transition metal obtained and the conductive carbon powder, and simultaneously support the hydroxide of the transition metal by the conductive carbon powder.

It is considered that the formation of the core of the hydroxide is realized by the mechanical energy of shear stress and centrifugal force that is applied to the reaction solution. The shear stress and centrifugal force are produced by centrifugal force added to the reaction solution by the turning of the reactor. The centrifugal force added to the reaction solution in the reactor is the centrifugal force in a category generally referred to as "ultracentrifugal force", which is generally 1500 $kgms^{-2}$ or more, preferably 70000 $kgms^{-2}$ or more, and especially preferably 270000 $kgms^{-2}$ or more.

An embodiment to use the suitable reactor with an external cylinder and an internal cylinder can be explained as follows. When the internal cylinder of the reactor in which the reaction solution is introduced is turned, the reaction solution in the internal cylinder is moved to the external cylinder via the through-holes, the reaction solution slides up between the outer wall surface of the internal cylinder and the inner wall surface of the external cylinder to the upper part of the inner wall surface of the external cylinder, by the centrifugal force produced by the turning of the internal cylinder. As a result, shear stress and centrifugal force are added to the reaction solution, and by the mechanical energy, the core of the hydroxide of the transition metal is formed between the outer wall surface of the internal cylinder and the inner wall surface of the external cylinder. Then this core grows while being dispersed in the reactor, and becomes supported on the conductive carbon powder.

In the reaction, it is preferable that a gap between the outer wall surface of the internal cylinder and the inner wall surface of the external cylinder is narrower because greater mechanical energy can be added to the reaction solution. The gap between the outer wall surface of the internal cylinder and the inner wall surface of the external cylinder is preferably 5 mm or less, more preferably 2.5 mm or less, especially preferably 1.0 mm or less. The gap between the outer wall surface of the internal cylinder and the inner wall surface of the external cylinder can be set up by the width of the shuttering board of the reactor and the quantity of the reaction solution that is introduced into the reactor.

There is no strict restriction on the turning time of the internal cylinder; the time can change according to the quantity of reaction solution or turning speed (the value of centrifugal force) of the internal cylinder, but is generally within the range of 0.5 to 10 minutes. By applying the ultracentrifugal treatment, most of the transition metal contained in the reaction solution is supported as a hydroxide by the conductive carbon powder in a short period of time.

After the reaction is finished, the turning of the internal cylinder is stopped and the conductive carbon powder that supports an even-size fine particle of the hydroxide of the transition metal is retrieved. In the recovered product, the conductive carbon powder supporting a fine particle of the hydroxide generally forms an aggregation that has a small diameter of 1000 nm or less and a comparatively even size.

(3) Heat Treatment Step a. Heat Treatment Step in the First Manufacturing Method In the first manufacturing method, the retrieved conductive carbon powder supporting the fine particle of the hydroxide of the transition metal is washed as needed and then heat-treated so that the hydroxide is transformed into an oxide nanoparticle on the conductive carbon powder. In the first manufacturing method, because the composite material where the hydroxide is supported on the conductive carbon powder as an even-size fine particle is used, the oxidation reaction of the hydroxide of the transition metal progresses rapidly and evenly, and thus the nanoparticle of the oxide obtained is also fine and has an even size.

There is no strict restriction on the atmosphere of the heat treatment. Heat treatment can be done in a vacuum, in an inert atmosphere such as nitrogen and argon, or in an atmosphere containing oxygen such as oxygen and air. Also, there is no restriction on the temperature and duration of the heat treatment; this can change according to the composition of the target oxide and the quantity of preparation, but is generally within the range of 10 minutes to 10 hours at a temperature between 200 to 300° C. in the case of heat treatment in an atmosphere containing oxygen, within the range of 10 minutes to 10 hours at a temperature between 250 to 600° C. in the case of heat treatment in an inert atmosphere, and within the range of 10 minutes to 10 hours at a temperature between room temperature to 200° C. in the case of heat treatment in a vacuum atmosphere.

It is preferable to perform the heat treatment at a temperature of 200 to 300° C. in an atmosphere containing oxygen. This is because the conductive carbon powder is not destroyed by burning even in an atmosphere containing oxygen if the temperature is 300° C. or less and a metal oxide can be obtained with good crystalline structure. If the heat treatment is given in an atmosphere that does not contain oxygen, the oxide may be reduced and the target oxide may not be obtained.

The composite material of a metal oxide and conductive carbon obtained by the first manufacturing method of the present invention is suitable as an electrode material of a battery and an electrochemical capacitor; especially, a composite material of $Fe_2O_3$, $MnO$, $MnO_2$, $Mn_2O_3$, $Mn_3O_4$, $CoO$, $Co_3O_4$, $NiO$, or $Ni_2O_3$ and conductive carbon is suitable as a negative electrode active material in a lithium ion secondary battery.

b. Heat Treatment Step in the Second Manufacturing Method

In the second manufacturing method, the retrieved conductive carbon powder supporting a fine particle of the hydroxide of the transition metal is washed as needed, mixed with at least one compound with a typical metal selected from a group consisting of elements in groups 1 and 2 in the periodic table, and heat-treated so that the hydroxide of the transition metal supported by the conductive carbon powder and the compound of the typical metal are made to react and transformed into a nanoparticle of a compound oxide. In this manufacturing method, because the conductive carbon powder supporting the hydroxide as an even-size fine particle is used, the reaction between the hydroxide of the transition metal and the compound of the typical metal progresses in a rapid and even manner, and the nanoparticle of the compound oxide obtained is also fine and has an even size.

As the compound of the typical metal belonging to group 1 in the periodic table, that is, Li, Na, K, Rb, Cs or Fr, or the compound of the typical metal belonging to group 2 in the periodic table, that is, Be, Mg, Ca, Sr, Ba and Ra, a compound containing the typical metal can be used without any restriction; for example, an inorganic metallic salt of the metal such as hydroxide, carbonate, halide, nitrate and sulfate, an organic metallic salt of the metal such as formate, acetate, oxalate and lactate, or a mixture of these can be used. These compounds can be used alone or used as a mixture of two or more kinds. A compound that contains different typical metal can be mixed at given quantities and used. It is preferable to use hydroxide because impurities such as a sulfur compound or a nitrogen compound do not remain behind and a compound oxide can be obtained rapidly.

A kneaded material is obtained by combining the conductive carbon powder supporting a fine particle of the hydroxide of the transition metal obtained by the supporting step and the compound of the typical metal with an adequate quantity of dispersion medium as needed, and kneading while vaporizing the dispersion medium as needed. As the dispersion medium for kneading, a medium that does not adversely affect the composite material can be used without any restriction; for example, water, methanol, ethanol or isopropyl alcohol can be suitably used, and water can be used especially suitably.

There is no strict restriction on the atmosphere of the heat treatment. Heat treatment can be done in a vacuum, in an inert atmosphere such as nitrogen and argon, or in an atmosphere containing oxygen such as oxygen and air. Also, there is no restriction on the temperature and duration of the heat treatment; this can change according to the composition of the target oxide and the quantity of preparation, but is generally within the range of 10 minutes to 10 hours at a temperature between 200 to 300° C. in the case of heat treatment in an atmosphere containing oxygen, within the range of 10 minutes to 10 hours at a temperature between approximately 250 to 600° C. in the case of heat treatment in an inert atmosphere, and within the range of 10 minutes to 10 hours at a temperature between room temperature to approximately 200° C. in the case of heat treatment in a vacuum atmosphere.

It is preferable to perform the heat treatment at a temperature of 200 to 300° C. in an atmosphere containing oxygen. This is because the conductive carbon powder is not destroyed by burning even in an atmosphere containing oxygen if the temperature is 300° C. or less and a compound oxide can be obtained with good crystalline structure. If the heat treatment is given in an atmosphere that does not contain oxygen, the compound oxide may be reduced and the target compound oxide may not be obtained.

The composite material of a compound oxide and conductive carbon that is obtained by the second manufacturing method of the present invention is suitable as an electrode material of a battery and an electrochemical capacitor. Especially, the composite material having the conductive carbon and the nanoparticle of $LiMO_2$ that has a layered rock salt structure, a layered $Li_2MnO_3$-$LiMO_2$ solid solution, or a spinel-type $LiM_2O_4$ (M in the formula is Mn, Fe, Co, Ni or a combination thereof), which is obtained by using lithium hydroxide as the hydroxide of the typical metal in the heat-treatment step, is suitable as a positive electrode active material of a lithium ion secondary battery.

Examples of $LiMO_2$ that has a layered rock salt structure, a layered $Li_2MnO_3$-$LiMO_2$ solid solution, or a spinel-type $LiM_2O_4$ are, $LiCoO_2$, $LiNiO_2$, $LiNi_{4/5}Co_{1/5}O_2$, $LiNi_{1/3}Co_{1/3}Mn_{1/3}O_2$, $LiNi_{1/2}Mn_{1/2}O_2$, $LiFeO_2$, $LiMnO_2$, $Li_2MnO_3$—$LiCoO_2$, $Li_2MnO_3$—$LiNiO_2$, $Li_2MnO_3$—$LiNi_{1/3}Co_{1/3}Mn_{1/3}$ $O_2$, $Li_2MnO_3$—$LiNi_{1/2}Mn_{1/2}O_2$, $Li_2MnO_3$—$LiNi_{1/2}$ $Mn_{1/2}O_2$—$LiNi_{1/3}Co_{1/3}Mn_{1/3}O_2$, $LiMn_2O_4$ and $LiMn_{3/2}Ni_{1/2}O_4$. By the second manufacturing method of the present invention, a composite material that contains a nanoparticle of the compound oxide and conductive carbon powder with good dispersion can be obtained. Especially, a composite material that contains a nanoparticle with a primary particle of 10 to 40 nm is particularly suitable as a positive electrode active material of a lithium ion secondary battery, and produces a lithium ion secondary battery with excellent rate characteristics. Particularly, a composite material using carbon nanotube as at least a part of the conductive carbon powder is a positive electrode active material that has high conductivity and that leads to a lithium ion secondary battery having especially excellent rate characteristics.

In the heat treatment step, if a $LiMO_2$ having a layered rock salt structure or a layered $Li_2MnO_3$—$LiMO_2$ solid solution is intended to be obtained, a spinel may be simultaneously formed in some cases. In such cases, it is preferable to give hydrothermal treatment after the aforementioned heat treatment, preferably heat treatment at 200 to 300° C. in an atmosphere containing oxygen. Then, the spinel is denatured into a layered structure by the hydrothermal treatment and a layered structure with high purity can be obtained. The hydrothermal treatment can be carried out under high temperature hot water at a temperature of 100° C. or more and at an atmospheric pressure of 1 bar or more, after the powder after the heat treatment and water, preferably a lithium hydroxide aqueous solution, are introduced into an autoclave.

EXAMPLES

The examples of the present invention are shown as follows, but the present invention is not limited to the following examples.

(1) Composite Material of $LiMn_2O_4$ (Spinel) and Conductive Carbon a. Manufacture of a Composite Material

Example 1

A reactor shown in FIG. 1 of Patent Document 2 (JP 2007-160151 A), which comprises concentric cylinders of an external cylinder and an internal cylinder, has through-holes on the side face of the internal cylinder, and has a shuttering board on the open end of the external cylinder, is used. A solution in which 2.45 g of $Mn(CH_3COO)_2.4H_2O$ and 0.225 g of Ketjen Black (diameter: approximately 40 nm) are added to 75 mL of water was introduced into the internal cylinder, and the internal cylinder was turned for 300 seconds to add centrifugal force of 70000 $kgms^{-2}$ to the reaction solution so that $Mn(CH_3COO)_2.4H_2O$ was dissolved and Ketjen Black was dispersed. Then the turning of the internal cylinder was suspended and a solution in which 0.6 g of $LiOH.H_2O$ was dissolved into water was added into the internal cylinder. The pH of the solution was 10. Then, the internal cylinder was turned again for 300 seconds to add 70000 $kgms^{-2}$ of centrifugal force to the reaction solution. In the meantime, a core of Mn hydroxide was formed between the inner wall of the external cylinder and the outer wall of the internal cylinder; this core grew and was supported on the surface of Ketjen Black. After the turning of the internal cylinder was stopped, Ketjen Black was filtered and retrieved, and dried in air at 100° C. for 12 hours. When the filtrate was inspected by ICP spectrometry, it was found that 95% or more of Mn contained in the raw material $Mn(CH_3COO)_2.4H_2O$ was supported. Then, the powder after drying and an aqueous solution that contained $LiOH.H_2O$ in an amount that made the ratio of Mn:Li=2:1 were mixed and kneaded, and after drying, the kneaded material was given heat treatment for 1 hour in air at the temperature of 280° C. so that a composite material was obtained.

Example 2

The procedure of Example 1 was repeated except that heat treatment was given in air at 300° C. for 1 hour instead of heat treatment in air at 280° C. for 1 hour.

Example 3

The procedure of Example 1 was repeated except that heat treatment was given in air at 350° C. for 1 hour instead of heat treatment in air at 280° C. for 1 hour.

Example 4

The procedure of Example 2 was repeated except that 0.225 g of carbon mixture in which Ketjen Black (diameter: approximately 40 nm) and carbon nanotube (diameter: approximately 20 nm, length: several hundred nm) were mixed at the mass ratio of 3:1 was used instead of 0.225 g of Ketjen Black.

Example 5

The procedure of Example 2 was repeated except that 0.225 g of carbon mixture in which Ketjen Black (diameter: approximately 40 nm) and carbon nanotube (diameter: approximately 20 nm, length: several hundred nm) were mixed at the mass ratio of 1:1 was used instead of 0.225 g of Ketjen Black.

Example 6

Acetylene black as a conductive agent was mixed with the composite material of Example 2 in a quantity of 5% by mass of the composite material.

Comparative Example 1

A solution in which 2.45 g of $Mn(CH_3COO)_2.4H_2O$, 0.33 g of $CH_3COOLi$ (Mn:Li=2:1) and 0.225 g of carbon mixture in which Ketjen Black (diameter: approximately 40 nm) and carbon nanotube (diameter: approximately 20 nm, length: several hundred nm) were mixed at the mass ratio of 1:1 was added to 75 mL of water was introduced into the internal cylinder of the reactor used in Example 1, and the internal cylinder was turned for 300 seconds to add 70000 $kgms^{-2}$ of centrifugal force to the reaction solution. After the turning of the internal cylinder was stopped, the liquid part was collected and inspected by ICP spectrometry, and it was found that only approximately 30% of Mn that was contained in $Mn(CH_3COO)_2.4H_2O$ as a raw material was supported by the carbon mixture. Therefore, all the contents in the reactor were retrieved, evaporated and dried in air at 100° C. Then, they were heat-treated in air at 300° C. for 1 hour, and a composite material was obtained.

FIG. 1 shows SEM images of the material after the supporting step and before the heat treatment step; (a) is a SEM image of the material in Comparative Example 1 and (b) is a SEM image of the material in Example 5. From the SEM image (b), it is found that, in Example 5, the carbon mixture supporting a fine particle of hydroxide forms an aggregation of a comparatively even size that has a diameter of 1000 nm or less. On the other hand, from the SEM image (a), it is found that, in Comparative Example 1, most of the compounds are amorphous, though partial aggregation is found, and this amorphous compound covers the carbon mixture.

Figure 2:
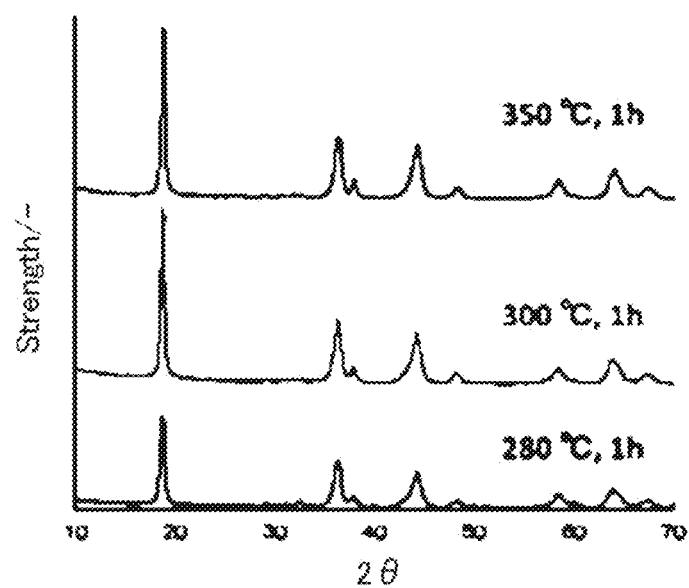
FIG. 2 shows X-ray powder diffraction diagrams of composite materials of $LiMn_2O_4$ and conductive carbon in working examples of the present invention.
Figure 3:
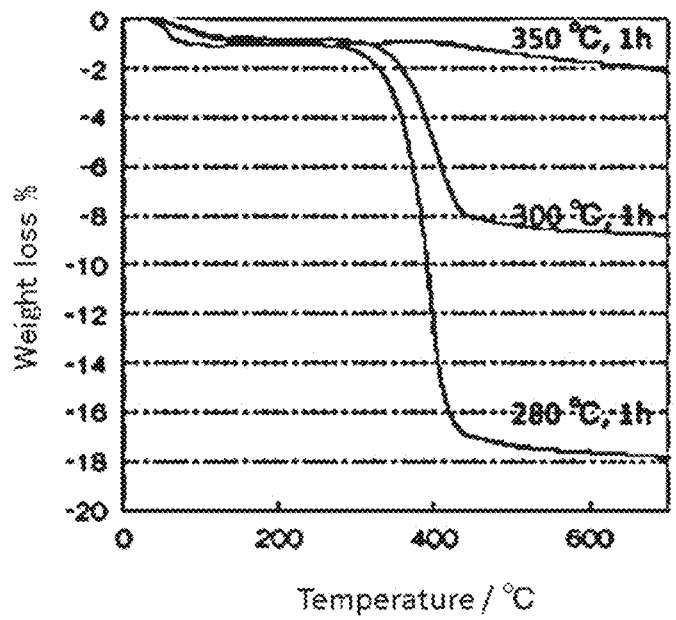
FIG. 3 shows the result of TG analysis of composite materials of $LiMn_2O_4$ and conductive carbon in working examples of the present invention.

FIG. 2 shows X-ray powder diffraction diagrams of Examples 1 to 3. At every temperature, crystallization of $LiMn_2O_4$ was found. Especially $LiMn_2O_4$ in the composite materials of Examples 2 and 3, which was heat-treated at 300° C. or more, showed high crystallization. FIG. 3 shows the result of TG analysis of the composite materials of Examples 1 to 3 in an air atmosphere where the temperature raising rate was 1° C./minute and the weight reduction amount was evaluated as carbon. In the composite material of Example 3, which was given heat treatment at 350° C., weight loss was hardly observed, and it was concluded that Ketjen Black was burnt in the course of the heat treatment. Therefore, it was found that heat treatment in air at 300° C. was particularly preferable.

Figure 4:
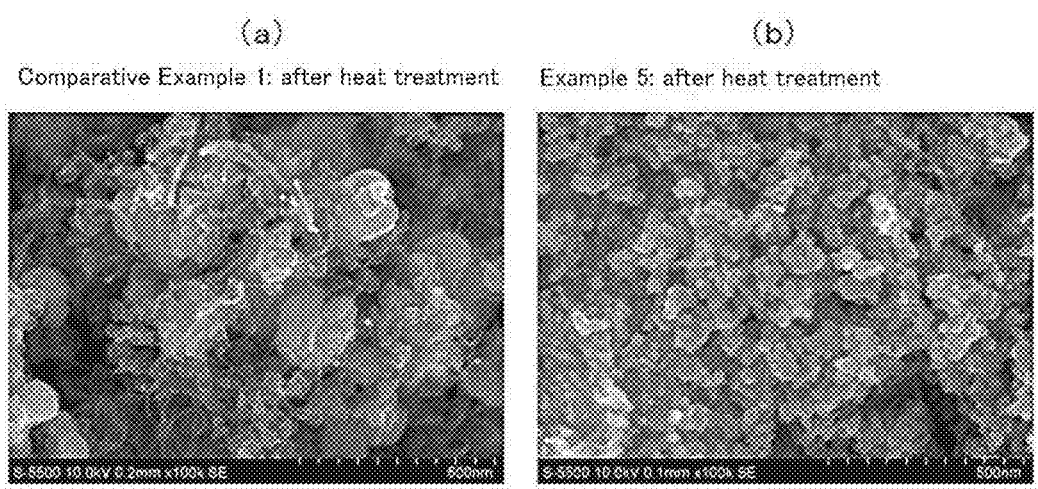
FIG. 4 shows SEM images of a composite material of $LiMn_2O_4$ and conductive carbon; (a) is an image of a comparative example and (b) is an image of a working example.
Figure 5:
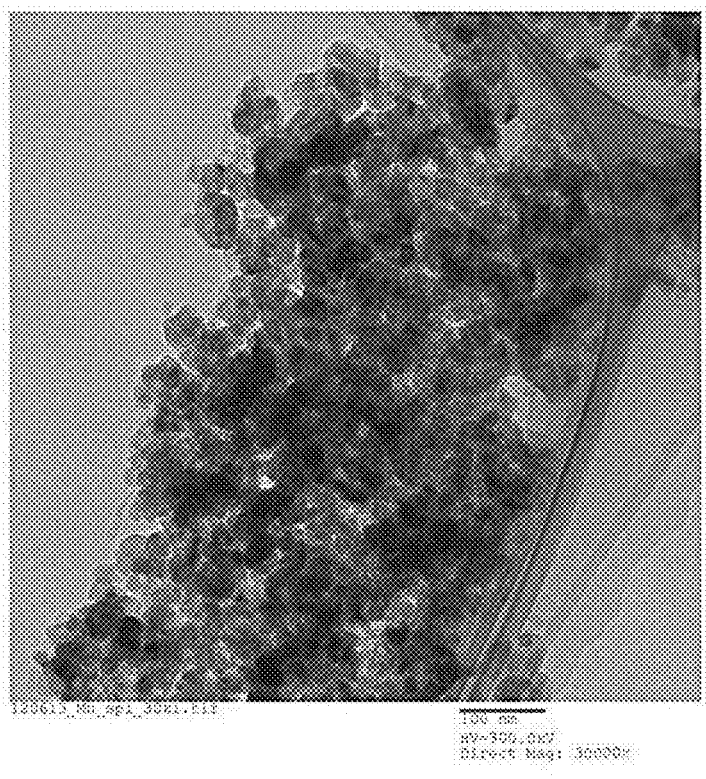
FIG. 5 shows a TEM image of a composite material of $LiMn_2O_4$ and conductive carbon in a working example of the present invention.

FIG. 4 shows SEM images of the composite materials after the heat treatment step; (a) is a SEM image of the composite material of Comparative Example 1 and (b) is a SEM image of the composite material of Example 5. From the SEM image (b), it is found that an even-size particle is formed in Example 5. FIG. 5 is a TEM image of the composite material of Example 5, and it is found that an initial particle of $LiMn_2O_4$ with a diameter of 10 to 40 nm is formed with good dispersibility. On the other hand, from the SEM image (a) of FIG. 4, it is found that the composite material of Comparative Example 1 contains grains in various sizes, including a large aggregation, and it is found that the dispersibility of $LiMn_2O_4$ is insufficient. This difference is considered to reflect the difference in the form of the compound on the conductive carbon powder in the material after the supporting step and before the heat treatment step.

b. Evaluation as a Half-Cell

Polyvinylidene fluoride in an amount of 10% by mass of the total was added to the composite material of each of Examples 2, 4 to 6 and Comparative Example 1 and the mixture obtained was formed to produce a positive electrode. A half-cell including the positive electrode, 1M $LiPF_6$ ethylene carbonate/diethyl carbonate (1:1) solution as an electrolyte, and lithium as a counter electrode was produced. For the half-cell obtained, the charge/discharge characteristics were evaluated under a wide range of conditions of electric current density. Note that while this evaluation is an evaluation of a half-cell, a similar effect can also be expected in a whole-cell using a negative electrode.

Figure 6:
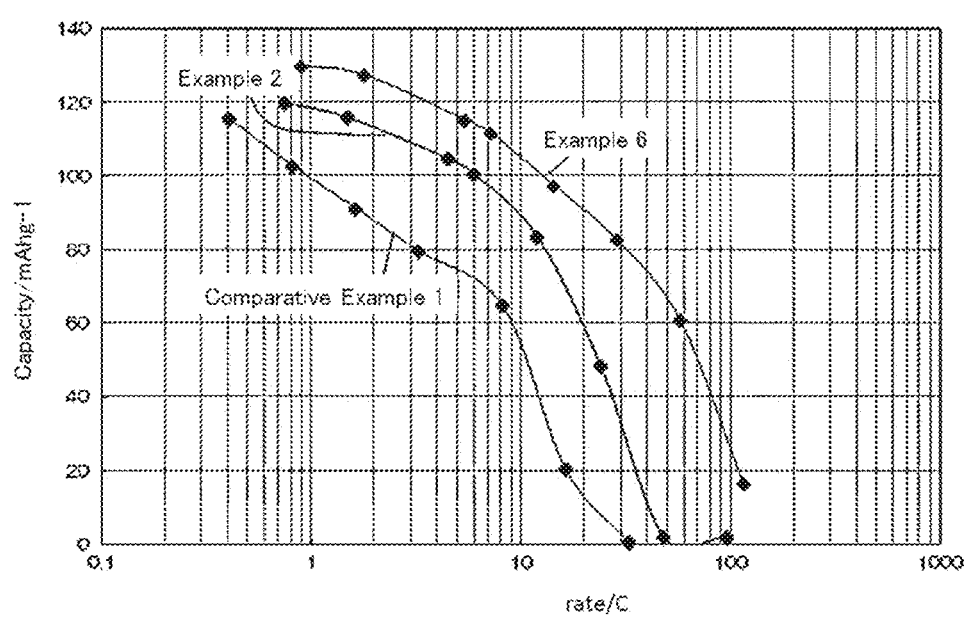
FIG. 6 shows the result of the evaluation of the rate characteristics of a half-cell where a composite material of $LiMn_2O_4$ and conductive carbon is used as a positive electrode active material.
Figure 7:
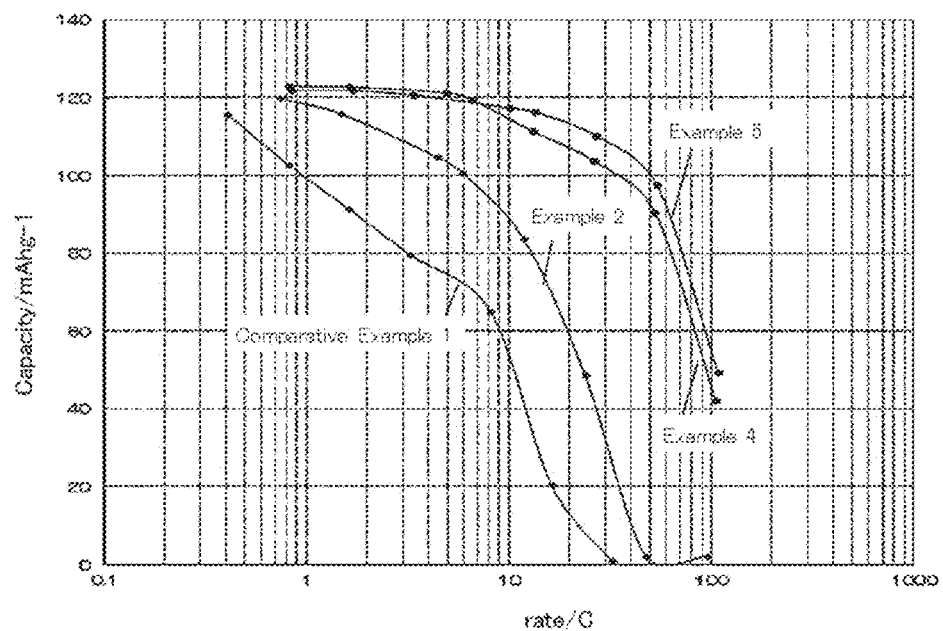
FIG. 7 shows the result of the evaluation of the rate characteristics of a half-cell where a composite material of $LiMn_2O_4$ and conductive carbon is used as a positive electrode active material.

FIG. 6 shows the relationship between the rate and discharge capacity of the half-cells using the composite materials of Examples 2 and 6 and Comparative Example 1, while FIG. 7 shows the relationship between the rate and discharge capacity of the half-cells using the composite materials of Examples 2, 4 and 5, and Comparative Example 1.

As can be seen from FIG. 6, by using the composite material of Example 2, compared with using the composite material of Comparative Example 1 that had inadequate dispersibility of $LiMn_2O_4$, the discharge capacity and rate characteristics of the half-cell was improved. Also, by mixing the conductive agent with the composite material of Example 2 (Example 6), the discharge capacity of the half-cell was improved, and a half-cell with excellent rate characteristics, which showed a gradual decrease in capacity as the rate increased, was obtained. Also, as can be seen from FIG. 7, by replacing a part of Ketjen Black of the composite material in Example 2 with carbon nanotube (Examples 4 and 5), the discharge capacity of the half-cell was improved significantly without introducing a conductive agent in the composite material. This is considered to result from the high conductivity of carbon nanotube. On the other hand, in the half-cell that employed the composite material of Comparative Example 1 with inadequate dispersibility of $LiMn_2O_4$, the capacity was remarkably low, even though carbon nanotube was contained in the composite material, and the capacity rapidly declined as the rate increased. Example 5 and Comparative Example 1 both employ a carbon mixture of Ketjen Black and carbon nanotube at the ratio of 1:1 in manufacturing composite materials, and the difference between the discharge capacity and rate characteristics of the half-cell using the composite material in Example 5 and the discharge capacity and rate characteristics of the half-cell using the composite material in Comparative Example 1 is considered to reflect the difference in the dispersibility of $LiMn_2O_4$ in the composite materials shown in FIGS. 4 and 5.

(2) Composite Material of $0.7Li_2MnO_3 \cdot 0.3LiNi_{0.5}Mn_{0.5}O_2$ and Conductive Carbon a. Manufacture of a Composite Material Example 7

A solution in which 1.54 g of $Mn(CH_3COO)_2 \cdot 4H_2O$, 0.274 g of $Ni(CH_3COO)_2$, 0.21 g of the carbon mixture of Ketjen Black (diameter: approximately 40 nm) and carbon nanotube (diameter: approximately 20 nm, length: several hundred nm) in the mass ratio of 1:1 were added to 75 mL of water was introduced into the internal cylinder of the reactor used in Example 1, and the internal cylinder was turned for 300 seconds to add 70000 $kgms^{-2}$ of centrifugal force to the reaction solution so that $Mn(CH_3COO)_2 \cdot 4H_2O$ and $Ni(CH_3COO)_2$ were dissolved and the carbon mixture was dispersed. The turning of the internal cylinder was suspended, and a solution in which 0.6 g of $LiOH \cdot H_2O$ was dissolved into water was added into the internal cylinder. The pH of the solution was 10. Then, the internal cylinder was turned again for 300 seconds to add 70000 $kgms^{-2}$ of centrifugal force to the reaction solution. In the meantime, cores of Mn hydroxide and Ni hydroxide were formed between the inner wall of the external cylinder and the outer wall of the internal cylinder; these cores grew and were supported on the surface of the carbon mixture. After the turning of the internal cylinder was stopped, the carbon mixture was filtered and retrieved, and dried in air at 100° C. for 12 hours. When the filtrate was inspected by ICP spectrometry, it was found that 95% or more of Mn and Ni contained in the raw materials $Mn(CH_3COO)_2 \cdot 4H_2O$ and $Ni(CH_3COO)_2$ was supported. Then, the powder after drying and an aqueous solution of $LiOH \cdot H_2O$ in an amount in the ratio of Mn:Li=1:2 were mixed and kneaded, and after drying, the kneaded material was given heat treatment in air at the temperature of 250° C. for 1 hour. Further, a composite material was obtained by introducing the powder after heat treatment and 2 mol/L of LiOH aqueous solution into the autoclave and giving hydrothermal treatment in saturated vapor at 200° C. for 12 hours.

Comparative Example 2

A solution in which 1.54 g of $Mn(CH_3COO)_2 \cdot 4H_2O$, 0.274 g of $Ni(CH_3COO)$, 0.78 g of $CH_3COOLi$ (Mn:Li=1:2)

and 0.21 g of carbon mixture in which Ketjen Black (diameter: approximately 40 nm) and carbon nanotube (diameter: approximately 20 nm, length: several hundred nm) were mixed at the mass ratio of 1:1 was added to 75 mL of water was introduced into the internal cylinder of the reactor used in Example 1, and the internal cylinder was turned for 300 seconds to add 70000 kgms$^{-2}$ of centrifugal force to the reaction solution. After the turning of the internal cylinder was stopped, the liquid part was collected and inspected by ICP spectrometry, and it was found that only approximately 30% of Mn and Ni that were contained in the raw materials $Mn(CH_3COO).4H_2O$ and $Ni(CH_3COO)_2$ was supported by the carbon mixture. Therefore, all the contents in the reactor were retrieved, evaporated and dried in air at 100° C., and heat-treated at 250° C. for 1 hour and a composite material was obtained.

Figure 8:
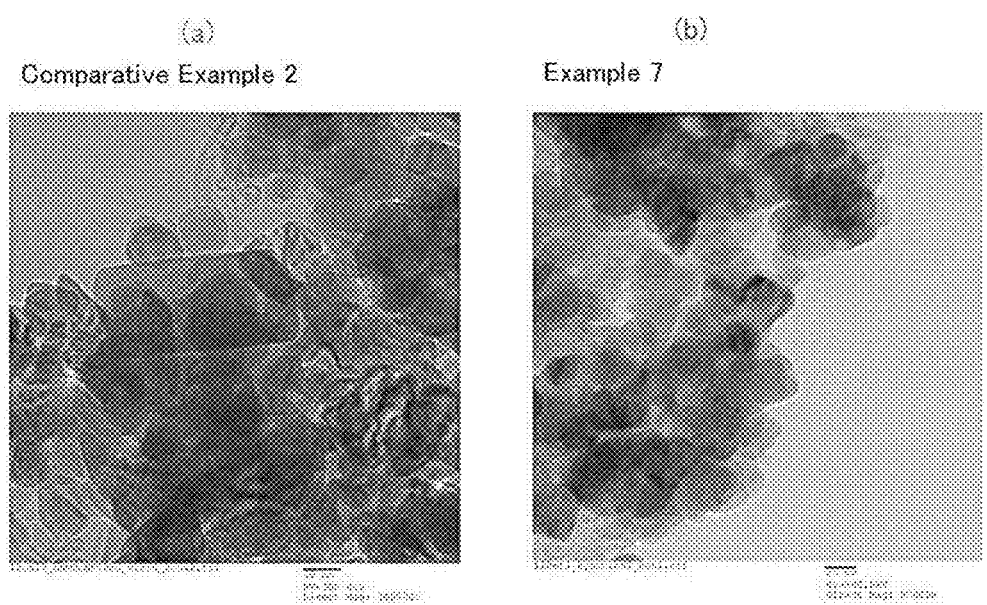
FIG. 8 shows TEM images of $0.7Li_2MnO_3 \cdot 0.3LiNi_{0.5}Mn_{0.5}O_2$ and conductive carbon; (a) is an image of a comparative example and (b) is an image of a working example.

FIG. 8 is TEM images of the composite materials of Example 7 and Comparative Example 2. FIG. 8 shows that the composite material of Example 7 contains an even crystal with a diameter of approximately 20 nm. On the other hand, the composite material of Comparative Example 2 contains a crystal with a diameter of 5 nm or less and a length of approximately 100 nm, and the crystal size is not even. This is considered to reflect the fact that, in the supporting step, a fine particle of hydroxide is supported by the carbon mixture with good dispersibility in Example 7, while in Comparative Example 2, only a material in which an aggregation of uneven size and an amorphous compound cover the carbon mixture is obtained. That is, in Example 7, even reaction proceeds and an even-size nanoparticle of a compound oxide is formed in high disparsibility in the heat-treatment and hydrothermal treatment, while in Comparative Example 2, uneven reaction proceeds and uneven-size compound oxide is formed in the heat treatment step.

b. Evaluation as a Half-Cell

Polyvinylidene fluoride in an amount of 10% by mass of the total was added to the composite material of each of Example 7 and Comparative Example 2 and the mixture obtained was formed to produce a positive electrode. A half-cell including the positive electrode, 1M LiPF$_6$ ethylene carbonate/diethyl carbonate (1:1) solution as an electrolyte, and lithium as a counter electrode was produced. For the half-cell obtained, the charge/discharge characteristics were evaluated under a wide range of conditions of electric current density. Note that while this evaluation is an evaluation of a half-cell, a similar effect can also be expected in a whole-cell using a negative electrode.

Figure 9:
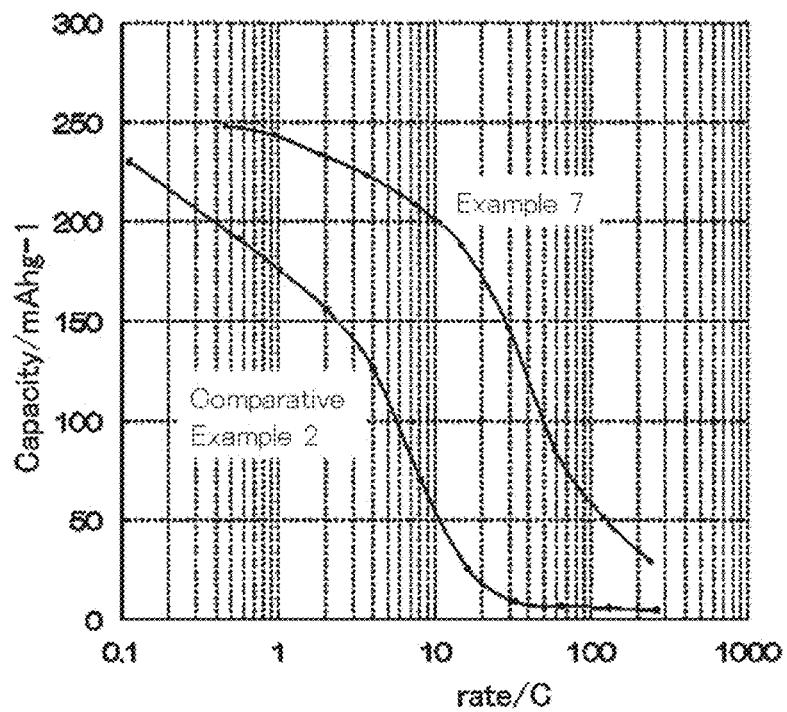
FIG. 9 shows the result of the evaluation of the rate characteristics of a half-cell where a composite material of $0.7Li_2MnO_3 \cdot 0.3 LiNi_{0.5}Mn_{0.5}O_2$ and conductive carbon is used as a positive electrode active material.

FIG. 9 shows the relationship of the rate and the discharge capacity of half-cells using the composite materials of Example 7 and Comparative Example 2. The half-cell using the composite material of Comparative Example 2 showed a remarkably small capacity compared with the half-cell using the composite material of Example 7; and the capacity significantly decreased as the rate increased, and little capacity was shown at a rate over 30 C. On the other hand, the half-cell using the composite material of Example 7 showed remarkably excellent rate characteristics and had a capacity over 50 mAhg$^{-1}$ even at the rate of 100 C.

(3) Composite Material of $Mn_3O_4$ and Conductive Carbon

Example 8

A solution in which 2.41 g of $Mn(CH_3COO)_2.4H_2O$ and 0.5 g of Ketjen Black (diameter approximately 40 nm) were added to 75 mL of water was introduced into the internal cylinder of the reactor used in Example 1, and the internal cylinder was turned for 300 seconds to add 70000 kgms$^{-2}$ of centrifugal force to the reaction solution so that $Mn(CH_3COO)_2.4H_2O$ was dissolved and Ketjen Black was dispersed. Then, the turning of the internal cylinder was suspended, and 0.3N NaOH aqueous solution was added into the internal cylinder. The pH of the solution was 10.5. Then, the internal cylinder was turned again for 300 seconds to add 70000 kgms$^{-2}$ of centrifugal force to the reaction solution. In the meantime, a core of Mn hydroxide was formed between the inner wall of the external cylinder and the outer wall of the internal cylinder, this core grew and was supported on the surface of Ketjen Black. After the turning of the internal cylinder was stopped, Ketjen Black was filtered and retrieved, and dried in air at 100° C. for 12 hours. Then it was further heat-treated in air at 130° C. for 16 hours and a composite material was obtained.

Comparative Example 3

A solution in which 2.41 g of $Mn(CH_3COO)_2.4H2O$ and 0.5 g of Ketjen Black (diameter: approximately 40 nm) were added to 75 mL of water was introduced into the internal cylinder of the reactor used in Example 1, and the internal cylinder was turned for 300 seconds to add 70000 kgms$^{-2}$ of centrifugal force to the reaction solution. Ketjen Black was filtered and retrieved, dried in air at 130° C. for 16 hours, and a composite material was obtained.

Figure 10:
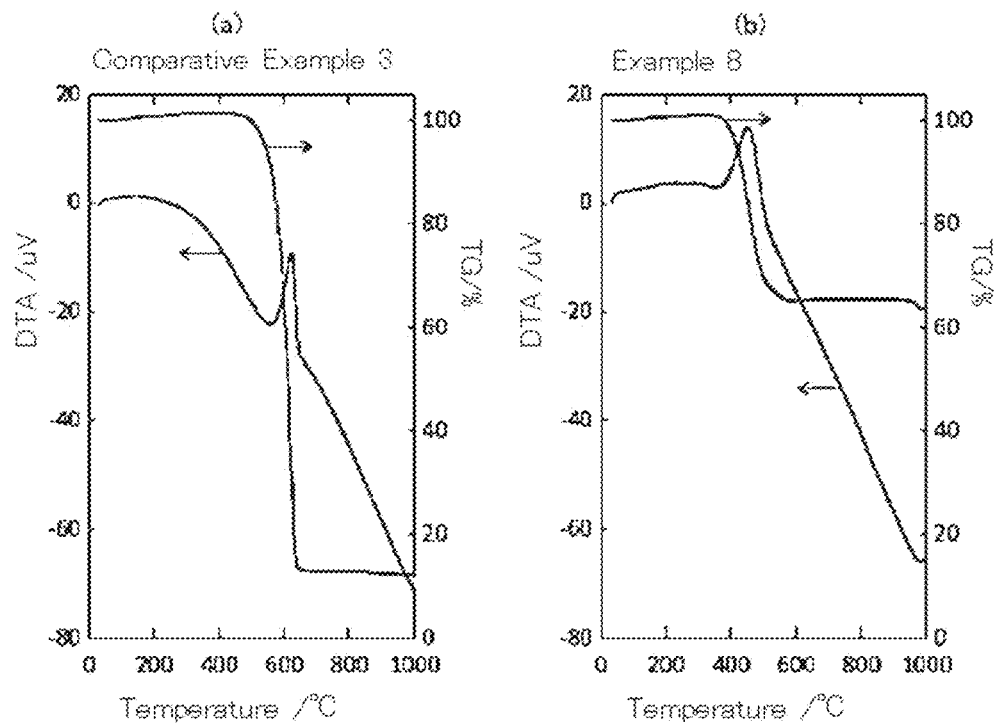
FIG. 10 shows TG-DTA analysis result of composite materials of $Mn_3O_4$ and conductive carbon; (a) is a result of a comparative example and (b) is a result of a working example.
Figure 11:
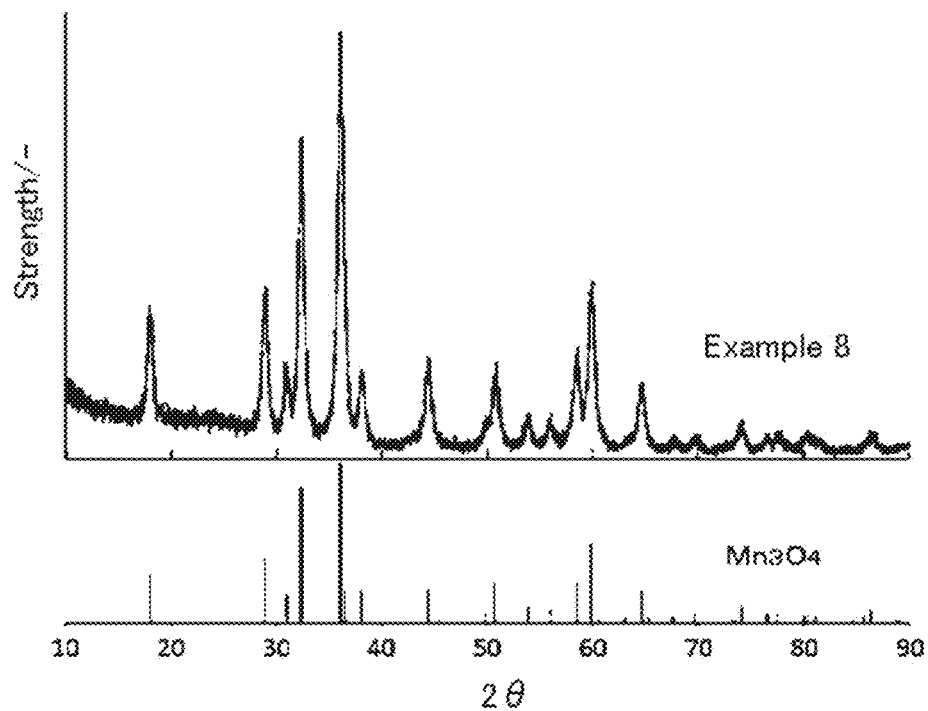
FIG. 11 shows an X-ray powder diffraction diagram of a composite material of $Mn_3O_4$ and conductive carbon in a working example of the present invention.

FIG. 10 shows the result of TG-DTA analysis of the composite materials in Example 8 and Comparative Example 3 at the temperature raising rate of 1° C./minute in air atmosphere. Also, FIG. 11 shows an X-ray powder diffraction diagram of the composite material of Example 8. As can be seen from FIG. 11, $Mn_3O_4$ was formed in the composite material of Example 8. FIG. 10 shows that a weight loss of approximately 90% occurred in the composite material of Comparative Example 3, while a weight loss of approximately 40% occurred in the composite material of Example 8. This weight loss is due to the burning of Ketjen Black. In Comparative Example 3, most of the Mn was not supported by Ketjen Black, even though the same amount of $Mn(CH_3COO)_2.4H_2O$ was used as in Example 8. On the other hand, in Example 8, most of the $Mn(CH_3COO)_2.4H_2O$ was supported by Ketjen Black.

Figure 12:
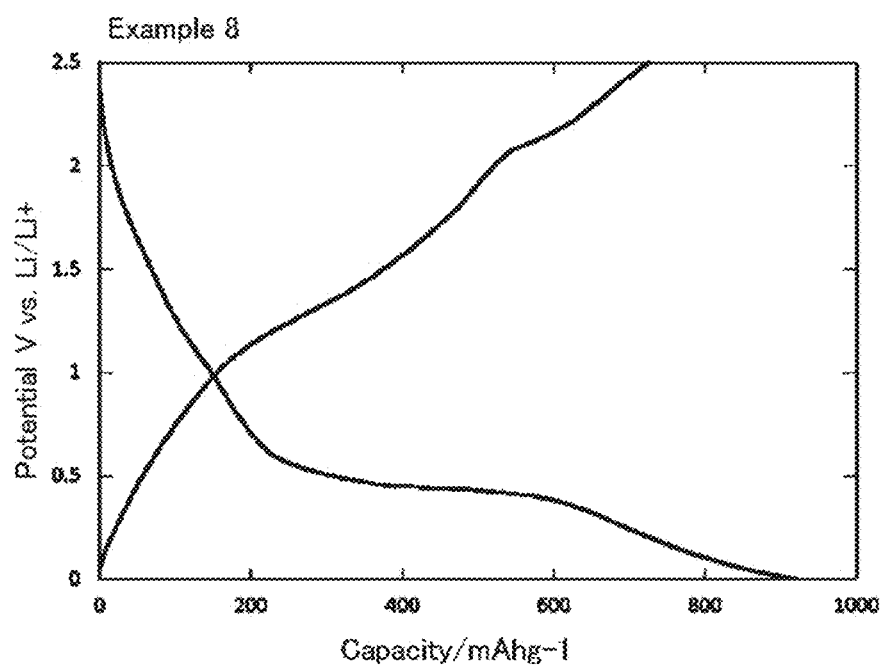
FIG. 12 shows charging/discharging curves of a half-cell in which a composite material of $Mn_3O_4$ and conductive carbon in a working example of the present invention is used as a positive electrode active material.

Polyvinylidene fluoride in an amount of 10% by mass of the total was added to the composite material of Example 8 and the mixture obtained was formed to produce a positive electrode. A half-cell including the positive electrode, 1M LiPF$_6$ ethylene carbonate/diethyl carbonate (1:1) solution as an electrolyte, and lithium as a counter electrode was produced. For the half-cell obtained, the charge/discharge characteristics were evaluated. The result is shown in FIG. 12. A capacity of approximately 800 mAhg$^{-1}$ was observed in the range of 0 to 2.5 V against Li/Li$^+$, and the composite material was found to be suitable for a negative electrode in a lithium ion secondary battery.

INDUSTRIAL APPLICABILITY

By the present invention, a composite material of a metal oxide and conductive carbon, which is suitable in the field such as a fuel battery, a secondary battery, an electrochemical capacitor, or an antistatic material, can be obtained.

What is claimed is:
1. A method for producing a composite material of a metal oxide and conductive carbon, comprising:
a preparation step to introduce into a rotatable reactor a reaction solution obtained by preparing a base solution comprising water, at least one compound with a tran- sition metal selected from a group consisting of Mn, Fe, Co and Ni which is dissolved in the water, and conductive carbon powder and then adding to the base solution a pH adjuster for adjusting a pH of the reaction solution in a range of 9 to 11;

a supporting step to add shear stress and centrifugal force to the reaction solution by rotating the reactor so as to form a core of a hydroxide of the transition metal, disperse the core of a hydroxide of the transition metal obtained and the conductive carbon powder, and simultaneously support a particle grown from the core of the hydroxide of the transition metal by the conductive carbon powder; and a heat treatment step to heat a mixture obtained by mixing the conductive carbon powder supporting the particle grown from the core of the hydroxide of the transition metal with at least one compound with a typical metal selected from a group consisting of elements in groups 1 and 2 of the periodic table so as to react the particle grown from the core of the hydroxide of the transition metal supported by the conductive carbon powder and the compound of a typical metal and transform to a nanoparticle of a compound oxide, wherein the compound of a typical metal is lithium hydroxide, and the nanoparticle of a compound oxide is selected from a group consisting of a nanoparticle of $LiMO_2$ having a layered rock salt structure, a layered $Li_2MnO_3$-$LiMO_2$ solid solution, or a spinel-type $LiM_2O_4$, wherein M in the formulas is Mn, Fe, Co, Ni or a combination thereof.

2. The method for producing a composite material of a metal oxide and conductive carbon according to claim 1, wherein the reactor comprises concentric cylinders of an external cylinder and an internal cylinder, the internal cylinder having through-holes on a side face, the outer cylinder having a shuttering board on an open end thereof, and in the supporting step, the reaction solution in the internal cylinder is moved to the external cylinder via the through-holes and the core of a hydroxide of the transition metal is formed between an outer wall surface of the internal cylinder and an inner wall surface of the external cylinder by the centrifugal force produced by turning of the internal cylinder.

3. A method for producing a composite material of a metal oxide and conductive carbon, comprising:

a preparation step to introduce into a rotatable reactor a reaction solution obtained by preparing a base solution comprising water, at least one compound with a transition metal selected from a group consisting of Mn, Fe, Co and Ni which is dissolved in the water, and conductive carbon powder and then adding to the base solution a pH adjuster for adjusting a pH of the reaction solution in a range of 9 to 11;

a supporting step to add shear stress and centrifugal force to the reaction solution by rotating the reactor so as to form a core of a hydroxide of the transition metal, disperse the core of a hydroxide of the transition metal obtained and the conductive carbon powder, and simultaneously support a particle grown from the core of the hydroxide of the transition metal by the conductive carbon powder; and a heat treatment step to heat a mixture obtained by mixing the conductive carbon powder supporting the particle grown from the core of the hydroxide of the transition metal with at least one compound with a typical metal selected from a group consisting of elements in groups 1 and 2 of the periodic table so as to react the particle grown from the core of the hydroxide of the transition metal supported by the conductive carbon powder and the compound of a typical metal and transform to a nanoparticle of a compound oxide, wherein the compound of a typical metal is lithium hydroxide, and the nanoparticle of a compound oxide is selected from a group consisting of a nanoparticle of $LiMO_2$ having a layered rock salt structure or a layered $Li_2MnO_3$-$LiMO_2$ solid solution, wherein M in the formulas is Mn, Fe, Co, Ni or a combination thereof, and hydrothermal treatment is given after heat-treatment in an atmosphere containing oxygen at a temperature of 200 to 300° C. in the heat treatment step.

4. The method for producing a composite material of a metal oxide and conductive carbon according to claim 3, wherein the reactor comprises concentric cylinders of an external cylinder and an internal cylinder, the internal cylinder having through-holes on a side face, the outer cylinder having a shuttering board on an open end thereof, and in the supporting step, the reaction solution in the internal cylinder is moved to the external cylinder via the through-holes and the core of a hydroxide of the transition metal is formed between an outer wall surface of the internal cylinder and an inner wall surface of the external cylinder by the centrifugal force produced by turning of the internal cylinder.

\* \* \* \* \*